United States Patent
Heo et al.

(10) Patent No.: US 10,151,646 B2
(45) Date of Patent: Dec. 11, 2018

(54) FORCE SENSOR USING DISPLACEMENT AMPLIFICATION MECHANISM AND APPARATUS HAVING THE SAME FOR MEASURING WEIGHT

(71) Applicant: i2A Systems Co., Ltd., Daejeon (KR)

(72) Inventors: Pilwon Heo, Daejeon (KR); Gwangmin Gu, Sejong (KR)

(73) Assignee: i2A SYSTEMS CO., LTD., Daejeon (KR)

( * ) Notice: Subject to any disclaimer, the term of this patent is extended or adjusted under 35 U.S.C. 154(b) by 185 days.

(21) Appl. No.: 15/195,015

(22) Filed: Jun. 28, 2016

(65) Prior Publication Data
US 2017/0241827 A1  Aug. 24, 2017

(30) Foreign Application Priority Data
Feb. 23, 2016  (KR) ........................ 10-2016-0021250

(51) Int. Cl.
*G01G 21/16* (2006.01)
*G01L 1/04* (2006.01)

(52) U.S. Cl.
CPC ............ *G01L 1/044* (2013.01); *G01G 21/161* (2013.01)

(58) Field of Classification Search
CPC .............................. G01L 1/044; G01G 21/161
See application file for complete search history.

(56) References Cited

U.S. PATENT DOCUMENTS 3,590,932 A * 7/1971 Dybwad .................. G01G 3/10
177/1
4,249,624 A * 2/1981 Kuhnle .................. G01G 21/00
177/211

(Continued)

FOREIGN PATENT DOCUMENTS

EP         1788371 A1 *  5/2007  ............. G01L 1/044
JP     2002-228680 A     8/2002

(Continued)

OTHER PUBLICATIONS

English-language translation of Korean Office Action for Application No. 10-2016-0021250 dated May 23, 2017.

(Continued)

*Primary Examiner* — Randy Gibson
(74) *Attorney, Agent, or Firm* — Birch, Stewart, Kolasch & Birch, LLP

(57) ABSTRACT

Disclosed is a force sensor and an apparatus having the sensor for measuring weight. The force sensor and apparatus can enhance detection sensitivity by amplifying a displacement of an elastic body having high strength, thereby measuring weight. The sensor includes: a base; an elastic structure provided as a housing disposed on the base, and downwardly deformed when weight is applied to the elastic structure; an adjusting member coupled to an upper surface of the elastic structure by penetrating the upper surface; a lever disposed below the elastic structure, and amplifying a displacement of the elastic structure transferred via the adjusting member by being in contact with the adjusting member; a sensor disposed above the base, and generating an electric signal indicative of a distance from the sensor to the lever; and a circuit board disposed between an upper surface of the base and a lower surface of the sensor.

15 Claims, 8 Drawing Sheets

(56) References Cited

U.S. PATENT DOCUMENTS

| | | | | |
|---|---|---|---|---|
| 4,332,174 | A * | 6/1982 | Suzuki | G01G 3/1404 177/211 |
| 4,338,825 | A * | 7/1982 | Amlani | G01G 3/1412 177/156 |
| 4,771,640 | A * | 9/1988 | Matsuura | G01L 1/24 250/227.29 |
| 4,802,541 | A * | 2/1989 | Bator | G01G 7/04 177/189 |
| 5,313,022 | A * | 5/1994 | Piroozmandi | G01L 1/2231 177/132 |
| 5,723,826 | A * | 3/1998 | Kitagawa | G01G 3/147 177/210 R |
| 5,801,339 | A * | 9/1998 | Boult | G01G 17/08 177/261 |
| 6,166,336 | A * | 12/2000 | Odiet | G01L 1/2243 177/154 |
| 6,365,847 | B1 | 4/2002 | Müller et al. | |
| 6,680,443 | B2 * | 1/2004 | Dixon | G01G 9/00 177/144 |
| 6,884,947 | B2 * | 4/2005 | Cipriani | G01L 5/0057 177/245 |
| 2002/0104377 | A1 | 8/2002 | Ishio | |
| 2005/0255448 | A1 | 11/2005 | Majumdar et al. | |
| 2007/0193788 | A1 | 8/2007 | Walter et al. | |
| 2011/0120235 | A1 * | 5/2011 | Shin | G01G 3/1404 73/862.636 |
| 2011/0315458 | A1 | 12/2011 | Kusumoto et al. | |
| 2015/0101870 | A1 * | 4/2015 | Gough | G01G 3/141 177/211 |
| 2016/0103011 | A1 * | 4/2016 | Lustenberger | G01G 1/18 73/862.637 |

FOREIGN PATENT DOCUMENTS

| | | |
|---|---|---|
| JP | 2007-64786 A | 3/2007 |
| KR | 10-2011-0060029 A | 6/2001 |
| KR | 10-2001-0109108 A | 12/2001 |
| KR | 10-2002-0040862 A | 5/2002 |
| KR | 10-2004-0088251 A | 10/2004 |
| KR | 10-2006-0047866 A | 5/2006 |
| KR | 10-2008-0023398 A | 3/2008 |
| KR | 10-2008-0075966 A | 8/2008 |
| KR | 10-2008-0077169 A | 8/2008 |
| KR | 10-2009-0117502 A | 11/2009 |
| KR | 10-2010-0010489 A | 2/2010 |
| KR | 10-2011-0066655 A | 6/2011 |
| KR | 10-1562182 B1 | 10/2015 |
| KR | 10-1804297 B1 | 12/2017 |

OTHER PUBLICATIONS

International Search Report for Appl. No. PCT/KR2016/006349 dated Oct. 12, 2016.

* cited by examiner

<DECREASE IN INITIAL VALUE>

<INCREASE IN INITIAL VALUE>

$$a : \delta = b : \Delta$$

$$\Delta = \frac{b}{a} \delta$$

FORCE SENSOR USING DISPLACEMENT AMPLIFICATION MECHANISM AND APPARATUS HAVING THE SAME FOR MEASURING WEIGHT

CROSS REFERENCE TO RELATED APPLICATION

The present application claims priority to Korean Patent Application No. 10-2016-0021250, filed Feb. 23, 2016, the entire contents of which is incorporated herein for all purposes by this reference.

BACKGROUND OF THE INVENTION

Field of the Invention

The present invention relates generally to a force sensor and an apparatus having the sensor for measuring weight. More particularly, the present invention relates to a force sensor using a displacement amplification mechanism and an apparatus having the sensor for measuring weight, whereby the displacement amplification mechanism enhances detection sensitivity of the force sensor by amplifying a displacement of an elastic body having high strength, thereby exactly measuring weight.

Description of the Related Art

Generally, a displacement of an elastic body is measured by using a force sensing resistor method, a pressure measuring method, a strain gauge method, etc. The conventional methods are shown in the following Table 1 in accordance with a performance.

TABLE 1

| | Force sensing resistor | Strain gauge | Pressure sensor | Capacitive type |
|---|---|---|---|---|
| Thickness and size | thin film | determined by size of structure | depending on diameter of tube | thin film |
| Necessity for voltage amplifier | no need | need | no need | no need |
| Response time | slow | fast | slow | fast |
| Accuracy | greatly decrease | within 3% | decrease | within 5% |
| Repeatability per hour | 40%/hour | — | — | — |
| Durability | bad | good | Possible to reduce | good |

The force sensing resistor is in the shape of a thin film and is flexible such that the force sensing resistor can be designed in a small size. However, the force sensing resistor has low capacity, low durability, and slow response time. Therefore, the force sensing resistor is used as a switch obtaining activation/deactivation information, rather than for obtaining large amounts of information.

The pressure sensor has linear values within a measurement range of the pressure sensor, and has an error rate slightly changing depending on the measurement range. However, response time of the pressure sensor is irregular depending on a position of pressure. In addition, the pressure can be converted into force but there is a limitation in obtaining an exact measurement value of the force.

The strain gauge is the most commonly used, and expresses weight as an electric signal by converting a strain rate of a structure deformed by the weight into the electric signal.

When the weight is applied to a structure, the structure is deformed, and the strain rate of the deformed structure should be transferred to the strain gauge without distortion. However, an adhesive attaching the strain gauge distorts the strain rate of the deformed structure, and the distorted strain rate is transferred to the strain gauge. The adhesive attaching the strain gauge is formed of a high molecular substance, and has an amorphous structure that is heterogeneous. Therefore, mechanical properties of the adhesive are uneven such that it is difficult to predict the mechanical properties.

In addition, in a process of producing an adhesive layer disposed between a structure and the strain gauge, it is difficult to produce the adhesive layer having a uniform thickness. Moreover, in a process of hardening the adhesive layer, it is difficult to ensure even mechanical properties of the adhesive layer. In an enlargement of the adhesive layer, a lot of bubbles are present in the adhesive layer, and the bubbles degrade the mechanical properties.

In the meantime, the most important resistant material of the strain gauge is made in the shape of a grid having thin lines. The cross sectional shape of the resistant material is uneven such that it is hard for the resistant material to perform tensile-compressive strain based on tensile-compressive strain of the structure. Consequently, the electric signal (output voltage according to applied voltage) changing depending on the resistant material is uneven.

The description of the related art described above describes the conventional methods and disadvantages thereof, and does not affect claims of the present invention described later or the scope of the present invention.

A force sensor calculates force values by measuring a displacement of the elastic body caused by force. Various methods are used to measure the displacement. Since a measurement range is defined according to the various methods, the elastic body is designed to make the displacement of the elastic body meet the measurement range.

When capacity of the force sensor decreases, strength of the elastic body is required to be reduced to exactly measure the displacement. In particular, in the case of an optical method or a capacitive method measuring large displacement in comparison with the strain gauge method, the elastic body is designed to have low strength such that the elastic body has a large displacement, thereby limiting minimum capacity of the force sensor.

In addition, when a high-capacity sensor is produced, the displacement of the elastic body is required to meet the measurement range such that the elastic body is designed to have low strength. Accordingly, it is difficult to apply the force sensor to a case in which high strength is required to secure high precision of a mechanism.

DOCUMENTS OF RELATED ART (Patent Document 1) Korean Patent Application Publication No. 10-2011-0066655 (17 Jun. 2011); and (Patent Document 2) Korean Patent Application Publication No. 10-2010-0010489 (1 Feb. 2010).

SUMMARY OF THE INVENTION

Accordingly, the present invention has been made keeping in mind the above problems occurring in the related art, and the present invention is intended to propose a force sensor using a displacement amplification mechanism and an apparatus having the sensor for measuring weight, the force sensor enhancing its sensitivity to measure exact weight by amplifying displacement of an elastic body having high strength.

In addition, the present invention is intended to propose a way of adjusting an initial value of the force sensor by using a fine adjustment screw, etc.

In addition, the present invention is intended to propose a way of adjusting sensitivity of the force sensor by moving the sensor and a lever of the force sensor for displacement amplification in a horizontal direction and, consequently, by controlling a distance between a fulcrum position and an input force position of the lever.

In order to achieve the above object, according to one aspect of the present invention, there is provided a force sensor using a displacement amplification mechanism, the force sensor including: a base; an elastic structure provided as a housing disposed on the base, and downwardly deformed when weight of an object to be measured is applied to the elastic structure; an adjusting member coupled to an upper surface of the elastic structure by penetrating the upper surface of the elastic structure; a lever disposed below the elastic structure, and amplifying a displacement of the elastic structure transferred via the adjusting member by being in contact with the adjusting member; a sensor disposed above the base, and generating an electric signal indicative of a distance from the sensor to the lever; and a circuit board disposed between an upper surface of the base and a lower surface of the sensor.

According to another aspect, there is provided an apparatus for measuring weight using a displacement amplification mechanism, the apparatus including: a base; an elastic structure provided as a housing disposed on the base, and downwardly deformed when weight of an object to be measured is applied to the elastic structure; an adjusting member coupled to an upper surface of the elastic structure by penetrating the upper surface of the elastic structure; a lever disposed below the elastic structure, and amplifying a displacement of the elastic structure transferred via the adjusting member by being in contact with the adjusting member; a sensor disposed above the base, and generating an electric signal indicative of a distance from the sensor to the lever; a circuit board disposed between an upper surface of the base and a lower surface of the sensor; and a converter converting the electric signal received from the sensor into weight information.

According to the force sensor using a displacement amplification mechanism and the apparatus having the sensor for measuring weight, in spite of using the elastic body having high strength, it is possible to amplify a displacement of the elastic body, which is caused by an external force, by using the lever. Therefore, it is possible to measure exact weight by enhancing sensitivity of the force sensor.

In addition, an increase in strength of the elastic body reduces a position error of a mechanism caused by deformation of a measuring portion. Also, it is possible to prevent strength degradation of the entire mechanism in which the force sensor inserted, the strength degradation caused by low strength of the force sensor.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
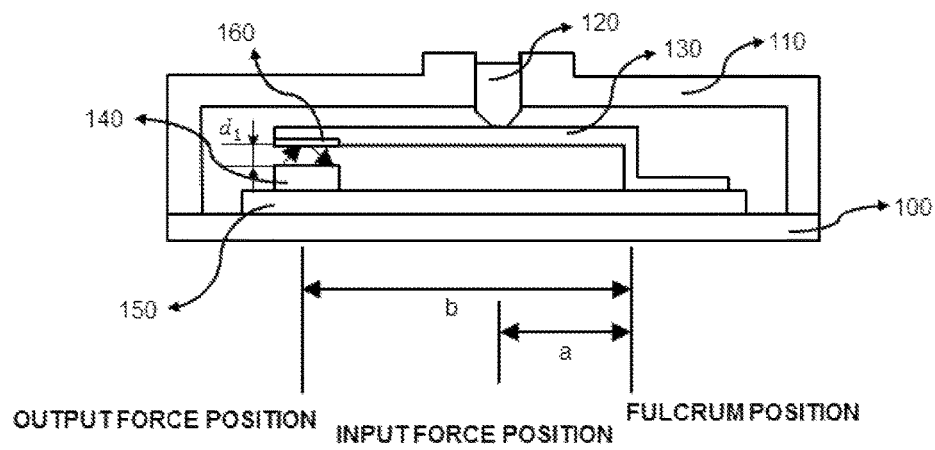
FIG. 1 is a structural view showing a force sensor using a displacement amplification mechanism according to an exemplary embodiment of the present invention.

The present invention may be modified in various ways and implemented by various embodiments, so that specific embodiments are shown in the drawings and will be described in detail. However, it is to be understood that the present invention is not limited to the specific exemplary embodiments, but includes all modifications, equivalents, and substitutions included in the spirit and the scope of the present invention.

It should be understood that when one element is referred to as being "connected to" or "coupled to" another element, it may be connected directly to or coupled directly to another element or be connected to or coupled to another element, having the other element intervening therebetween.

On the other hand, it is to be understood that when one element is referred to as being "connected directly to" or "coupled directly to" another element, it may be connected to or coupled to another element without the other element intervening therebetween.

Terms used herein are used only in order to describe specific embodiments rather than limiting the present invention. As used herein, the singular forms are intended to include the plural forms as well, unless the context clearly indicates otherwise. It will be further understood that the terms "comprises" or "have" used in this specification, specify the presence of stated features, processes, operations, components, parts, or a combination thereof, but do not preclude the presence or addition of one or more other features, numerals, processes, operations, components, parts, or a combination thereof.

Unless otherwise defined, all terms including technical and scientific terms used herein have the same meaning as commonly understood by one of ordinary skill in the art to which the present invention belongs. It should be understood that the terms defined by the dictionary are identical with the meanings within the context of the related art, and they should not be ideally or excessively formally defined unless the context clearly dictates otherwise in this specification.

Hereinafter, the present invention is described in detail with reference to the accompanying drawings. The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention. Further, if not stated, the technologic and scientific terms used herein have the meanings generally understood by those skilled in the art, and functions and configurations known in the art that may make the subject matter of the present invention unclear are not described and shown in the drawings. However, the drawings are provided as example for those skilled in the art to be able to more clearly understand the spirit of the present invention. Accordingly, the present invention is not limited to the drawings and may be achieved in other ways. Further, like reference numerals are given to like components throughout the specification. It should be noted that the same components are given the same reference numerals in any drawings.

FIG. 1 is a structural view showing a force sensor using a displacement amplification mechanism according to an exemplary embodiment of the present invention.

As shown in FIG. 1, the force sensor using a displacement amplification mechanism includes a base 100; an elastic structure 110 provided as a housing disposed on the base 100, and downwardly deformed when weight of an object to be measured is applied to the elastic structure; an adjusting member 120 coupled to an upper surface of the elastic structure 110 by penetrating the upper surface of the elastic structure 110; a lever 130 for displacement amplification disposed below the elastic structure 110, and amplifying a displacement of the elastic structure 110 transferred via the adjusting member 120 by being in contact with the adjusting member 120; a sensor 140 disposed above the base 100, and generating an electric signal indicative of a distance $d_1$ from the sensor to the lever 130; and a circuit board 150 disposed between an upper surface of the base 100 and a lower surface of the sensor 140.

The adjusting member 120 adjusts an initial position of the lever 130 by being coupled to the elastic structure 110 by screw-type engagement. Namely, an initial height (initial distance value between the sensor and the lever) of the lever 130 is adjusted by rotating the adjusting member 120.

The lever 130 may be a kind of metal plate, etc. The lever 130 may be a lever having both ends in contact with the elastic structure 110 or with the circuit board 150, rather than a lever open at an end thereof.

The sensor 140 indicates all sensors that can be used to detect a distance such as an optical sensor, a proximity sensor, or a capacitive sensor, etc. For example, the sensor 140 may be a reflective optical sensor, and the lever 130 may include a reflective plate 160 on a surface of the lever facing the reflective optical sensor.

Figure 2:
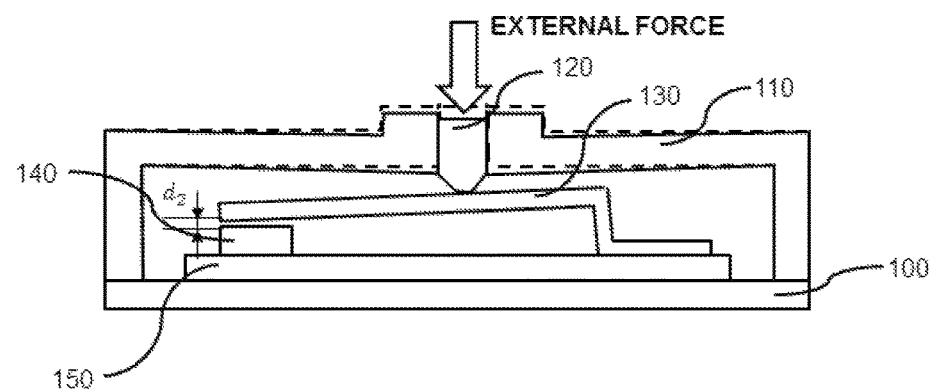
FIG. 2 is a view for explaining an operation mode of the force sensor using a displacement amplification mechanism according to the exemplary embodiment of the present invention.

FIG. 2 is a view for explaining an operation mode of the force sensor using a displacement amplification mechanism according to the exemplary embodiment of the present invention.

Referring to FIG. 2, the elastic structure 110 is downwardly deformed when weight (external force) of an object to be measured is applied to the elastic structure 110. As shown in FIG. 2, dotted lines indicate an initial position of the elastic structure 110 without external force applied to the elastic structure 110.

When the elastic structure 110 is deformed by the external force, the adjusting member 120 downwardly moves to press the lever 130. Therefore, a distance $d_2$ from the lever 130 to the sensor 140 in a state of the deformed elastic structure is shorter than the distance $d_1$ from the lever 130 to the sensor 140 in an initial state of the elastic structure.

That is, with the lever 130, it is possible to greatly amplify the displacement of the elastic structure 110 transferred via the adjusting member 120.

For example, a displacement of the elastic structure 110 is about 0~100 μm, and the amplified displacement of the elastic structure 110 by the lever 130 is about 0~0.5 mm.

Figure 3A:
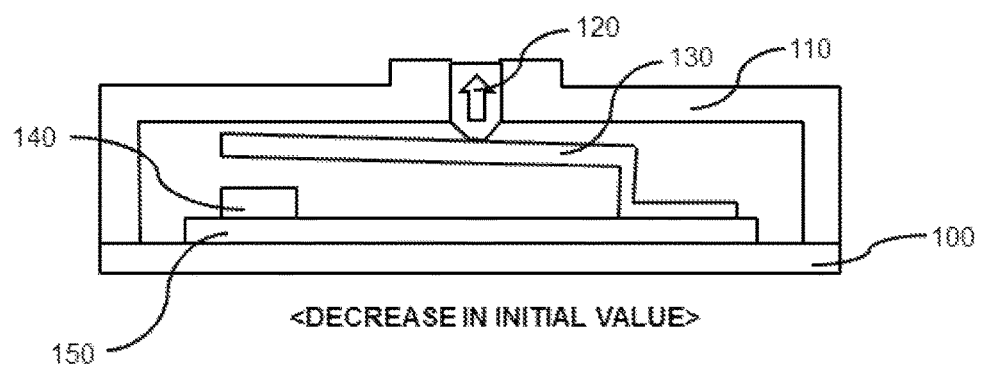
FIGS. 3A and 3B are views for explaining a way of setting an initial value of the force sensor using a displacement amplification mechanism according to the exemplary embodiment of the present invention.
Figure 3B:
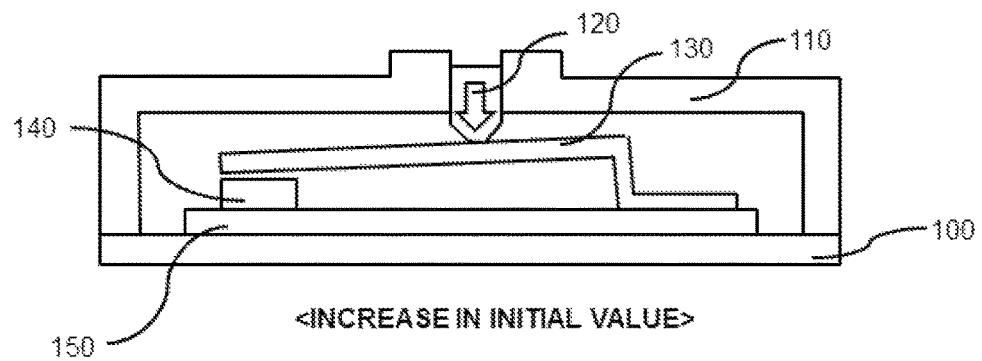

FIGS. 3A and 3B are views for explaining a way of setting an initial value of the force sensor using a displacement amplification mechanism according to the exemplary embodiment of the present invention.

The adjusting member 120 may be a kind of screw, and is coupled to the elastic structure by screw-type engagement, and is in contact with the lever 130.

As shown in FIG. 3A, the adjusting member 120 is rotated to be located at a higher position where it is higher than an original position of the adjusting member 120. Therefore, due to elasticity of the lever 130, an initial position of the lever 130 in a state of the adjusting member 120 located at the higher position is higher than an initial position of the lever 130 in a state of the adjusting member 120 located at the original position. Accordingly, a distance from the lever 130 to the sensor 140 in the state of the adjusting member 120 located at the higher position is farther than a distance from the lever 130 to the sensor 140 in the state of the adjusting member 120 located at an original position. In this case, an amount of light received by the force sensor is reduced such that the initial value of the force sensor decreases.

As shown in FIG. 3B, the adjusting member 120 is rotated to be located at a lower position where is lower than an original position of the adjusting member 120. Therefore, an initial position of the lever 130 in a state of the adjusting member 120 located at the lower position is lower than an initial position of the lever 130 in a state of the adjusting member 120 located at the original position. Accordingly, a distance from the lever 130 to the sensor 140 in the state of the adjusting member 120 located at the lower position is shorter than a distance from the lever 130 to the sensor 140 in the state of the adjusting member 120 located at an original position. In this case, an amount of light received by the force sensor is raised such that an initial value of the force sensor increases.

Generally, every sensor has its own operation section and characteristics. For example, when a particular sensor is required to operate in an operation section having linear characteristics of the particular sensor, an initial value for operating the particular sensor can be set by adjusting the adjusting member 120.

As shown in FIG. 3A, when the initial value of the force sensor decreases, a distance that can be detected by the force sensor increases. However, when the initial value of the force sensor increases, as shown in FIG. 3B, a distance that can be detected by the force sensor decreases. It is noted that the distances can be different depending on types of the sensor.

Therefore, in order to obtain weight information of the object to be measured from an output signal outputted from the force sensor, it is required that a lookup table for exact weight information that is based on the initial position (a position of the adjusting member 120) of the lever 130, or a lookup table for values required to compensate for the exact weigh information, or a functional relationship between sensor output value, which is based on the position of the adjusting member 120, and the exact weight information.

Figure 4A:
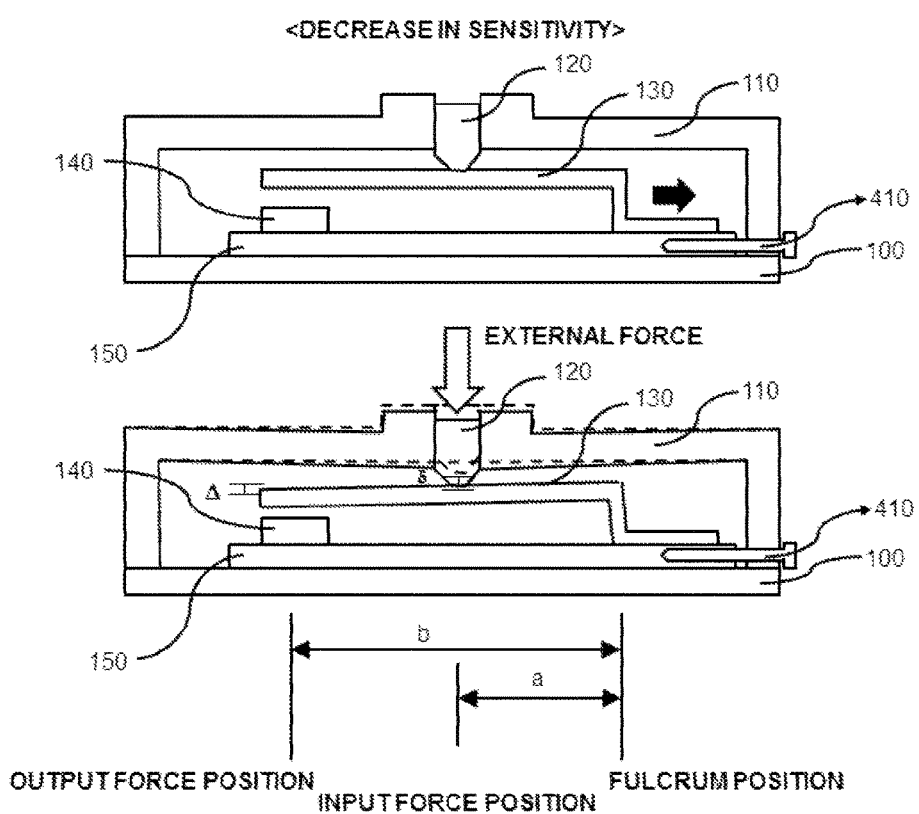
FIGS. 4A to 4C are views for explaining a way of adjusting sensitivity of the force sensor according to the exemplary embodiment of the present invention.
Figure 4B:
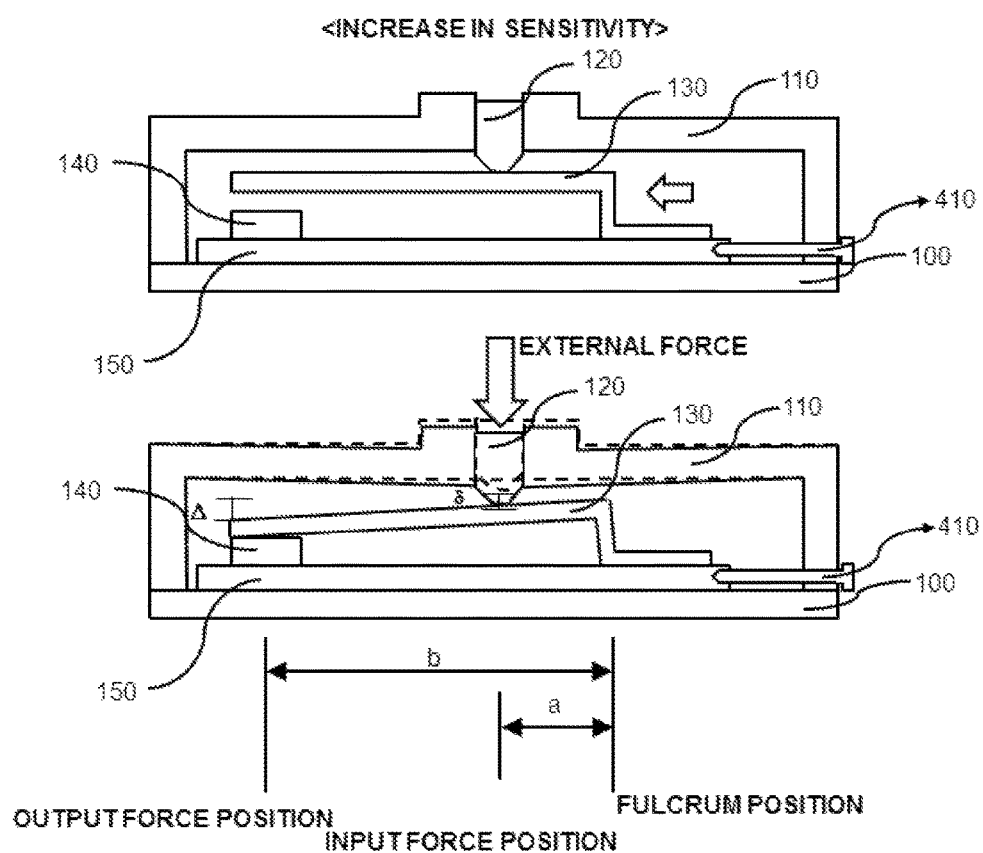
Figure 4C:
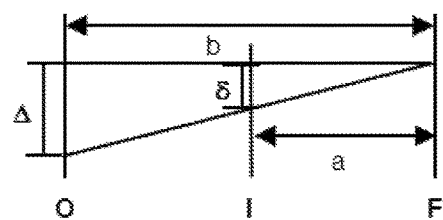

FIGS. 4A to 4C are views for explaining a way of adjusting sensitivity of the force sensor according to the exemplary embodiment of the present invention.

As shown in FIGS. 4A to 4C, the lever 130, the sensor 140, and the circuit board 150 are installed to be movable in a horizontal direction such that positions of input force, output force, and fulcrum are adjusted based on a horizontal position of the lever 130.

For example, the lever 130, the sensor 140, and the circuit board 150 are moved in a horizontal direction by rotating a screw 410 connected to the circuit board 150. A distance 'b' from the fulcrum position to the output force position is always fixed, the positions of input force, output force, and fulcrum are adjusted by adjusting a distance 'a' from the fulcrum position to the input force position.

Referring to FIG. 4A, the lever 130, the sensor 140, and the circuit board 150 are entirely moved in the black arrow direction by rotating the screw 410. Accordingly, the distance 'a' from the fulcrum position to the input force position can be increased, thus when an external force is applied to the elastic structure, a displacement of the elastic structure at the input force position of the lever 130 is δ, and a displacement of the elastic structure at the output force position of the lever 130 is Δ.

Referring to FIG. 4B, the lever 130, the sensor 140, and the circuit board 150 are entirely moved in the white arrow direction by rotating the screw 410. Accordingly, the distance 'a' from the fulcrum position to the input force position can be decreased, thus when an external force is applied to the elastic structure, a displacement of the elastic structure at the input force position of the lever 130 is δ, and displacement of the elastic structure at the output force position of the lever 130 is Δ.

The proportional expression, which is a:δ=b:Δ, is shown in FIG. 4C. The displacement Δ at the output force position (O) is proportional to the distance 'b' from the fulcrum position to the output force position, and is inversely proportional to the distance 'a' from the fulcrum position (F) to the input force position (I).

At the lever 130, the distance 'b' from the fulcrum position to the output force position is always fixed. Therefore, by rotating the screw 410, the distance 'a' from the fulcrum position to the input force position can be decreased such that the displacement Δ increases. Also, by rotating the screw 410, the distance 'a' from the fulcrum position to the input force position can be increased such that the displacement Δ decreases. That is, it is possible to adjust the sensitivity of the force sensor by adjusting the distance 'a' from the fulcrum position to the input force position.

Comparing FIGS. 4A and 4B, when the elastic structure 110 is downwardly deformed by an external force, and the displacement of the elastic structure 110 is transferred to the lever 130 via the adjusting member 120, the displacement of the lever 130 of FIG. 4B is larger than the displacement of the lever 130 of FIG. 4A.

With the same external force applied to the cases of FIGS. 4A and 4B, the movement of the lever 130 is small at FIG. 4A; however, the movement of the lever 130 is large at FIG. 4B.

That is, FIG. 4A shows a decrease in sensitivity of the force sensor, and FIG. 4B shows an increase in sensitivity of the force sensor.

Figure 4D:
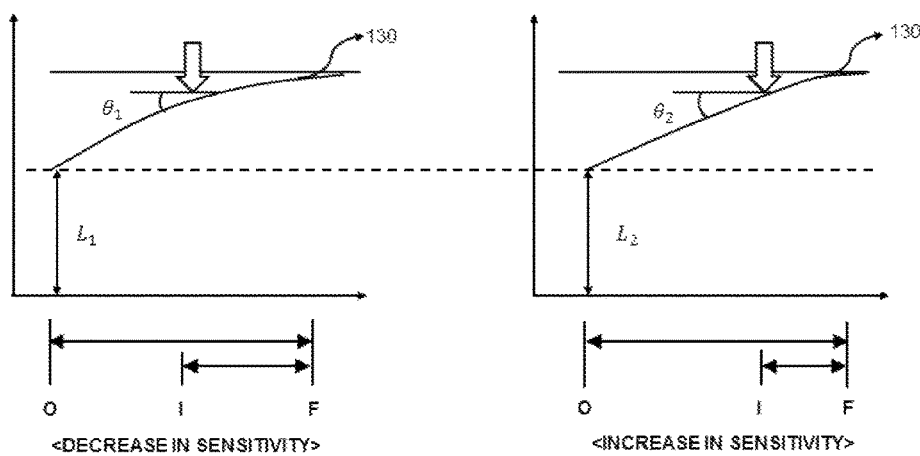
FIG. 4D is a view for explaining characteristics of the force sensor according to the adjusting of the sensitivity of the force sensor.

FIG. 4D is a view for explaining characteristics of the force sensor according to the adjusting of the sensitivity of the force sensor.

Referring to FIG. 4D, although an external force applied to the case of the decrease in sensitivity is different from an external force applied to the case of the increase in sensitivity, a distance detected by the sensor 140 of the former case can be the same as a distance detected by the sensor 140 of the latter case.

As described on the left side of FIG. 4D, in the case of the decrease in sensitivity, an inclination angle of the lever 130 is $\theta_1$ by the external force applied to the input force position (I). The sensor 140 detects a distance from the lever 130 to the sensor 140 as $L_1$.

As described on the right side of FIG. 4D, in the case of the increase in sensitivity of the force sensor, an inclination angle of the lever 130 is $\theta_2$ by the external force applied to the input force position. The sensor 140 detects a distance from the lever 130 to the sensor 140 as $L_2$.

That is, when the input force position is changed to adjust sensitivity of the force sensor, $L_1$ and $L_2$ can be the same values in spite of that the external force applied to each of the both cases is different from each other. However, although $L_1$ and $L_2$ are the same value, $\theta_1$ and $\theta_2$ are different values that are the inclination angles of the reflective plates. Therefore, a signal detected by the sensor 140 of the former case is different from a signal detected by the sensor 140 of the latter case.

Accordingly, in order to obtain the weight information of the object to be measured from the output signal outputted from the force sensor, it is required that a lookup table for exact weight information that is based on the horizontal position (sensitivity adjusting distance) of the lever 130, or a lookup table for values required to compensate for the exact weigh information, or a functional relationship between a sensor output value, which is based on the horizontal position of the lever 130, and the exact weight information.

Figure 5:
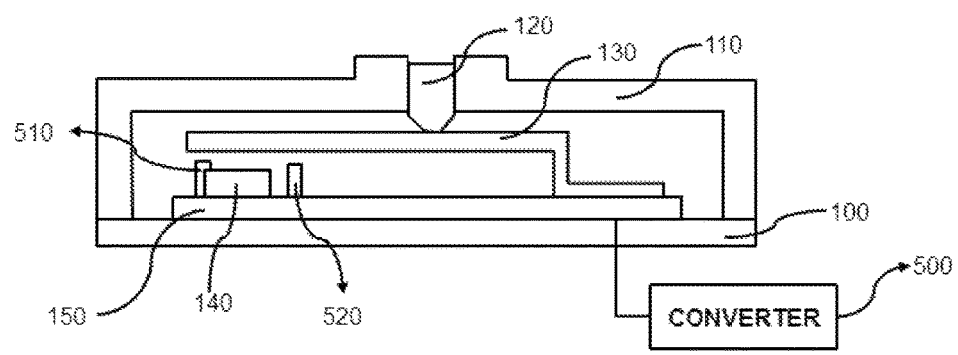
FIG. 5 is a structural view showing a force sensor using a displacement amplification mechanism according to another exemplary embodiment of the present invention.

FIG. 5 is a structural view showing a force sensor using a displacement amplification mechanism according to another exemplary embodiment of the present invention.

As shown in FIG. 5, the force sensor using a displacement amplification mechanism further includes a protective member 510 having a height higher than a height of the sensor 140. The protective member 510 is disposed on the circuit board 150, and covers a side of the sensor 140 to a portion of an upper surface of the sensor 140, thereby preventing a collision between the lever 130 and the sensor 140.

In addition, the force sensor further includes a second protective member 520 disposed on the circuit board 150 at a location spaced apart from a side of the sensor 140 by a predetermined distance. The second protective member 520 can prevent the collision between the lever 130 and the sensor 140.

In the meantime, an apparatus having the force sensor for measuring weight further includes a converter 500 converting the electric signal received from the sensor into weight information.

As described above in FIGS. 3A to 4C, the converter 500 stores a lookup table for exact weight information that is based on a position of the adjusting member 120, a horizontal position of the lever 130, and the electric signal sensed and outputted by the sensor 140, or stores a lookup table for values required to compensate for the exact weight information, or stores a functional relationship between a sensor output value and the exact weight information.

Figure 6:
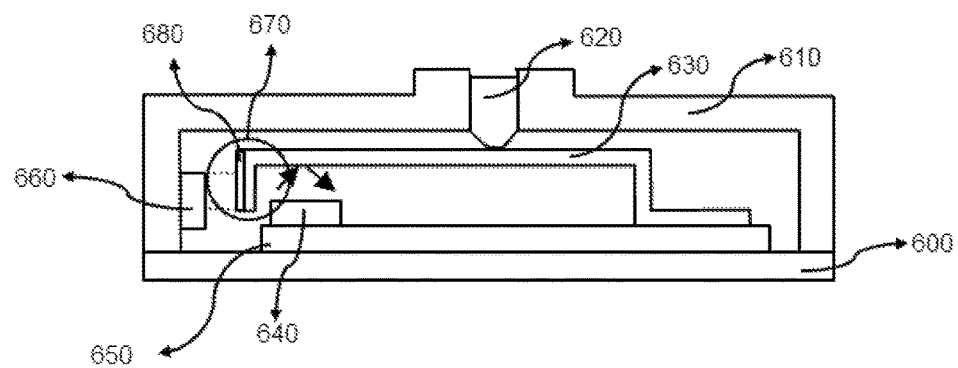
FIG. 6 is a structural view showing a force sensor using a displacement amplification mechanism according to a further exemplary embodiment of the present invention.

FIG. 6 is a structural view showing a force sensor using a displacement amplification mechanism according to a further exemplary embodiment of the present invention.

As shown in FIG. 6, the force sensor using a displacement amplification mechanism includes: a base 600; an elastic structure 610 provided as a housing disposed on the base 600, and downwardly deformed when weight of an object to be measured is applied to the elastic structure; an adjusting member 620 coupled to an upper surface of the elastic structure 610 by penetrating the upper surface of the elastic structure 610; a lever 630 for displacement amplification disposed below the elastic structure 610, and amplifying a displacement of the elastic structure 610 transferred via the adjusting member 620 by being in contact with the adjusting member 620; a first sensor 640 disposed above the base 600, and generating an electric signal indicative of a distance from the first sensor 640 to the lever 630; and a circuit board 650 disposed between an upper surface of the base 600 and a lower surface of the first sensor 640. The lever 630 includes a protruding part 670 downwardly protruding from an end of the lever 630 facing the first sensor 640. The force sensor further includes a second sensor 660 disposed on an inner surface of the elastic structure 610 facing a front surface of the protruding part 670 of the lever 630, the second sensor 660 generating an electric signal indicative of a surface area onto which the protruding part is projected.

Since the sensor 140 is equal to the first sensor 640, detailed descriptions of the first sensor 640 will be omitted.

The first sensor 640 detects a distance from the lever 630 to the first sensor 640, on the other hand, the second sensor 660 detects the surface area onto which the protruding part 670 of the lever 630 is projected That is, according to the other exemplary embodiment of the present invention, the force sensor outputs a signal indicating magnitude of the external force detected by using a plurality of sensors. The force sensor using the plurality of sensors may include a plurality of the first sensors disposed in several positions, and a plurality of the second sensors disposed in several positions.

The second sensor 660 indicates all sensors that can be used to detect a surface area and include, for example, an optical sensor, a proximity sensor, or a capacitive sensor, etc. For example, the second sensor 660 may be a reflective optical sensor, and the lever 630 may include a reflective plate 680 on a surface of the lever 630 facing the reflective optical sensor.

The first sensor 640 detects a distance from the first sensor to the reflective plate, and the second sensor 660 detects a surface area onto which the reflective plate is projected. Therefore, it is possible to obtain more precise weight information by combining values of the distances detected by the plurality of the first sensors and the plurality of the second sensors.

In addition, in order to obtain weight information of the object to be measured from an output signal outputted from the force sensor, the force sensor stores a lookup table for exact weight information that is based on a horizontal position of the lever, a position of the adjusting member, and the electric signal sensed and outputted, or stores a lookup table for values required to compensate for the exact weight information, or stores a functional relationship between a sensor output value and the exact weight information, wherein the lookup tables and the function relationship are provided for each of the first and second sensors.

Figure 7:
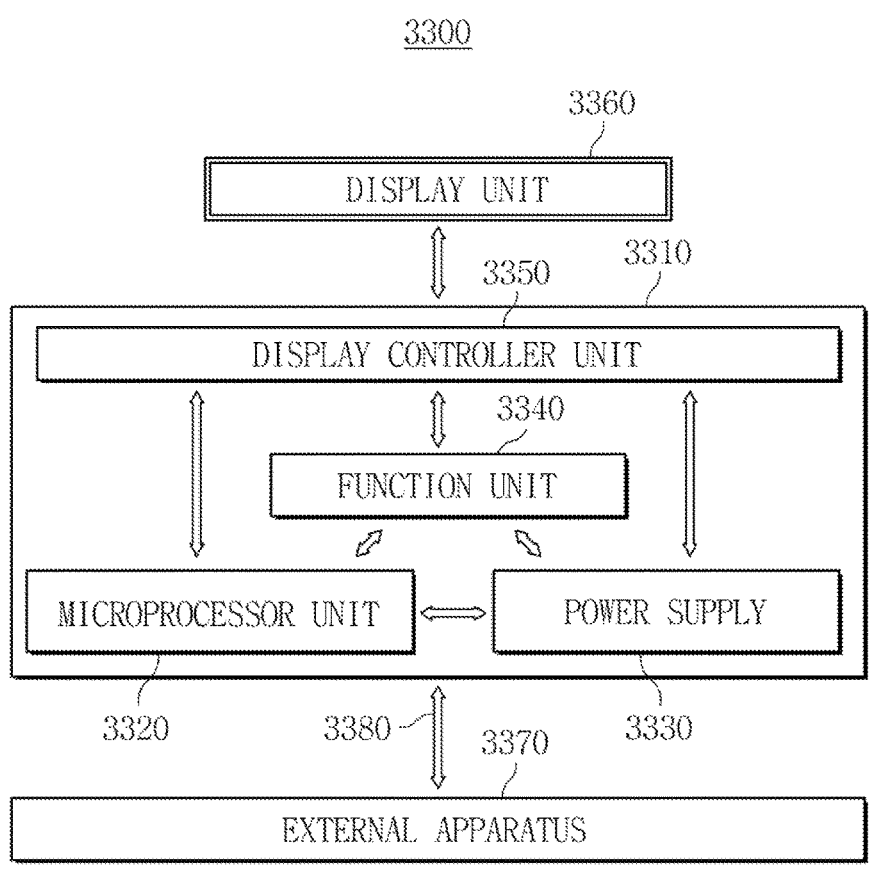
FIGS. 7 and 8 are block diagrams schematically showing electronic systems according to exemplary embodiments of the present invention.
Figure 8:
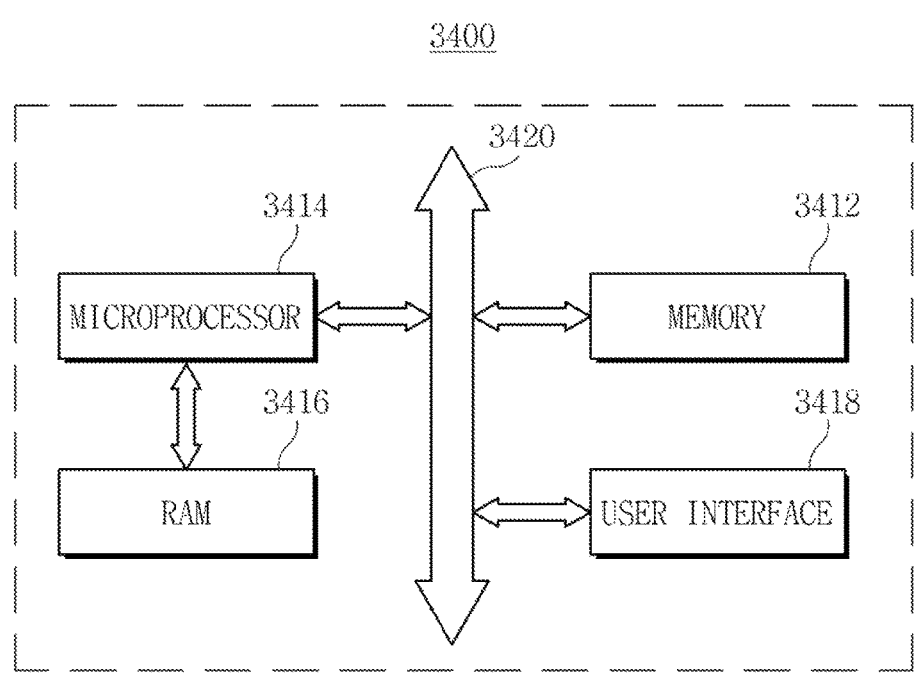

FIGS. 7 and 8 are block diagrams schematically showing electronic systems 3300 and 3400 according to exemplary embodiments of the present invention.

Referring the FIG. 7, the electronic system 3300 may include a body 3310, a display unit 3360, and an external apparatus 3370.

The body 3310 may include a microprocessor unit 3320, a power supply 3330, a function unit 3340, a display control unit 3350, or all.

The body 3310 may include a system board, a motherboard having a printed circuit board, etc., a case, or all. The microprocessor unit 3320, the power supply 3330, the function unit 3340, and the display control unit 3350 may be mounted or disposed on an upper surface of the body 3310 or on the interior of the body 3310. The display unit 3360 may be disposed on the upper surface of the body 3310 or on the interior/exterior of the body 3310.

The display unit 3360 may display an image processed by the display control unit 3350. For example, the display unit 3360 may include a liquid crystal display (LCD), active matrix organic light emitting diodes (AMOLED), or various display panels. The display unit 3360 may include a touch screen. Therefore, the display unit 3360 may have input and output functions.

The power supply 3330 may supply current or voltage to the microprocessor unit 3320, the function unit 3340, the display control unit 3350, etc. The power supply 3330 may include a rechargeable battery, a socket for a battery, or a voltage/current converter.

The microprocessor unit 3320 may control the function unit 3340 and the display unit 3360 by using voltage received from the power supply 3330. For example, the microprocessor unit 3320 may include a CPU or an application processor (AP).

The function unit 3340 may perform various functions. For example, the function unit 3340 may include various units such as a touch pad, a touch screen, a volatile/nonvolatile memory, a memory card controller, a camera, a light, a processor playing voice and video, a transmitting and receiving antenna for wireless communications, a speaker, a microphone, a USB port, etc.

The microprocessor unit 3320 or the function unit 3340 may receive an output signal outputted from the force sensor or the apparatus for measuring weight of the exemplary embodiments of the present invention.

Referring to FIG. 8, the electronic system 3400 may include a microprocessor 3414 performing data communications by a bus line 3420, a memory system 3412, and a user interface 3418. The microprocessor 3414 may include a CPU or an application processor (AP). The electronic system 3400 may further include a RAM 3416 directly communicating with the microprocessor 3414.

The microprocessor 3414 or the RAM 3416 or both may be assembled within a single package. The user interface 3418 may be used to input information to the electronic system 3400 or to output information from the electronic system 3400. For example, the user interface 3418 may include various input/output devices such as a touch pad, a touch screen, a keyboard, a mouse, a scanner, a voice detector, a cathode ray tube (CRT) monitor, a liquid crystal display (LCD), active matrix organic light emitting diodes (AMOLED), a plasma display panel (PDP), a printer, a light, etc.

The memory system 3412 may store codes for the microprocessor 3414, data processed by the microprocessor 3414, or external input data. The memory system 3412 may include a memory controller, a hard disk, or a solid state drive (SSD). The microprocessor 3414, the RAM 3416, or the memory system or all may receive an output signal outputted from the force sensor or the apparatus for measuring weight of the exemplary embodiments of the present invention.

Although the invention is described with reference to specific items such as specific structural elements, to merely some embodiments, and to drawings, such specific details disclosed herein are merely representative for purposes of helping more comprehensive understanding of the present invention. The present invention, however, is not limited to only the example embodiments set forth herein, and those skilled in the art will appreciate that the present invention can be embodied in many alternate forms.

Accordingly, the present invention is intended to cover not only the exemplary embodiments, but also various alternatives, modifications, equivalents and other embodiments that may be included within the spirit and scope of the present invention as defined by the appended claims.

What is claimed is:

1. A force sensor using a displacement amplification mechanism, the force sensor comprising:
   a base;
   an elastic structure provided as a housing disposed on the base, and downwardly deformed when weight of an object to be measured is applied to the elastic structure;
   an adjusting member coupled to an upper surface of the elastic structure by penetrating the upper surface of the elastic structure;
   a lever disposed below the elastic structure, and amplifying a displacement of the elastic structure transferred via the adjusting member by being in contact with the adjusting member;
   a sensor disposed above the base, and generating an electric signal indicative of a distance from the sensor to the lever; and
   a circuit board disposed between an upper surface of the base and a lower surface of the sensor,
   wherein the adjusting member adjusts an initial position of the lever by being coupled to the elastic structure by a screw-type engagement.

2. The force sensor of claim 1, wherein the lever is installed to be movable in a horizontal direction such that positions of input force, output force, and fulcrum are adjusted based on a horizontal position of the lever.

3. The force sensor of claim 1, wherein the sensor is an optical sensor, a proximity sensor, or a capacitive sensor.

4. The force sensor of claim 1, wherein the sensor is a reflective optical sensor, and the lever includes a reflective plate on a surface of the lever facing the reflective optical sensor.

5. The force sensor of claim 1, wherein the lever includes a protruding part downwardly protruding from an end of the lever facing the sensor, wherein the force sensor further comprises a second sensor disposed on an inner surface of the elastic structure facing a front surface of the protruding part of the lever, the second sensor generating an electric signal indicative of a surface area onto which the protruding part is projected.

6. The force sensor of claim 1, further comprising:
   a protective member having a height higher than a height of the sensor.

7. The force sensor of claim 6, further comprising:
   a second protective member disposed on the circuit board at a location spaced apart from a side of the sensor by a predetermined distance.

8. An apparatus for measuring weight using a displacement amplification mechanism, the apparatus comprising:
   a base;
   an elastic structure provided as a housing disposed on the base, and downwardly deformed when weight of an object to be measured is applied to the elastic structure;
   an adjusting member coupled to an upper surface of the elastic structure by penetrating the upper surface of the elastic structure;
   a lever disposed below the elastic structure, and amplifying a displacement of the elastic structure transferred via the adjusting member by being in contact with the adjusting member;
   a sensor disposed above the base, and generating an electric signal indicative of a distance from the sensor to the lever;
   a circuit board disposed between an upper surface of the base and a lower surface of the sensor; and
   a converter converting the electric signal received from the sensor into weight information,
   wherein the lever is installed to be movable in a horizontal direction such that positions of input force, output force, and fulcrum are adjusted based on a horizontal position of the lever.

9. The apparatus of claim 8, wherein the converter stores a lookup table for exact weight information that is based on a horizontal position of the lever, a position of the adjusting member, and the electric signal sensed and outputted.

10. The apparatus of claim 8, wherein the converter stores a lookup table for values required to compensate for exact weight information that is based on a horizontal position of the lever, a position of the adjusting member, and the electric signal sensed and outputted, or stores a functional relationship between a sensor output value and the exact weight information.

11. The force sensor of claim 5, wherein the second sensor is an optical sensor, a proximity sensor or a capacitive sensor.

12. A force sensor, comprising:
    a base;
    an elastic structure provided as a housing disposed on the base, the elastic structure being spaced from the base in a first direction and deformed in the first direction when force is applied to the elastic structure;
    a lever spaced from the elastic structure in the first direction, and amplifying a displacement of the elastic structure;
    a sensor disposed between the base and the lever in the first direction, and generating an electric signal indicative of a distance from the sensor to the lever; and
    a circuit board disposed between an upper surface of the base and a lower surface of the sensor.

13. The force sensor according to claim 12, further comprising a projection connected to and extending downwardly from the elastic structure to transfer movement of the elastic member to the lever.

14. The force sensor according to claim 13, wherein the projection is adjustable relative to the elastic structure.

15. The force sensor according to claim 12, wherein the sensor is movable in a second direction, the second direction being perpendicular to the first direction.

* * * * *